Figure 1:
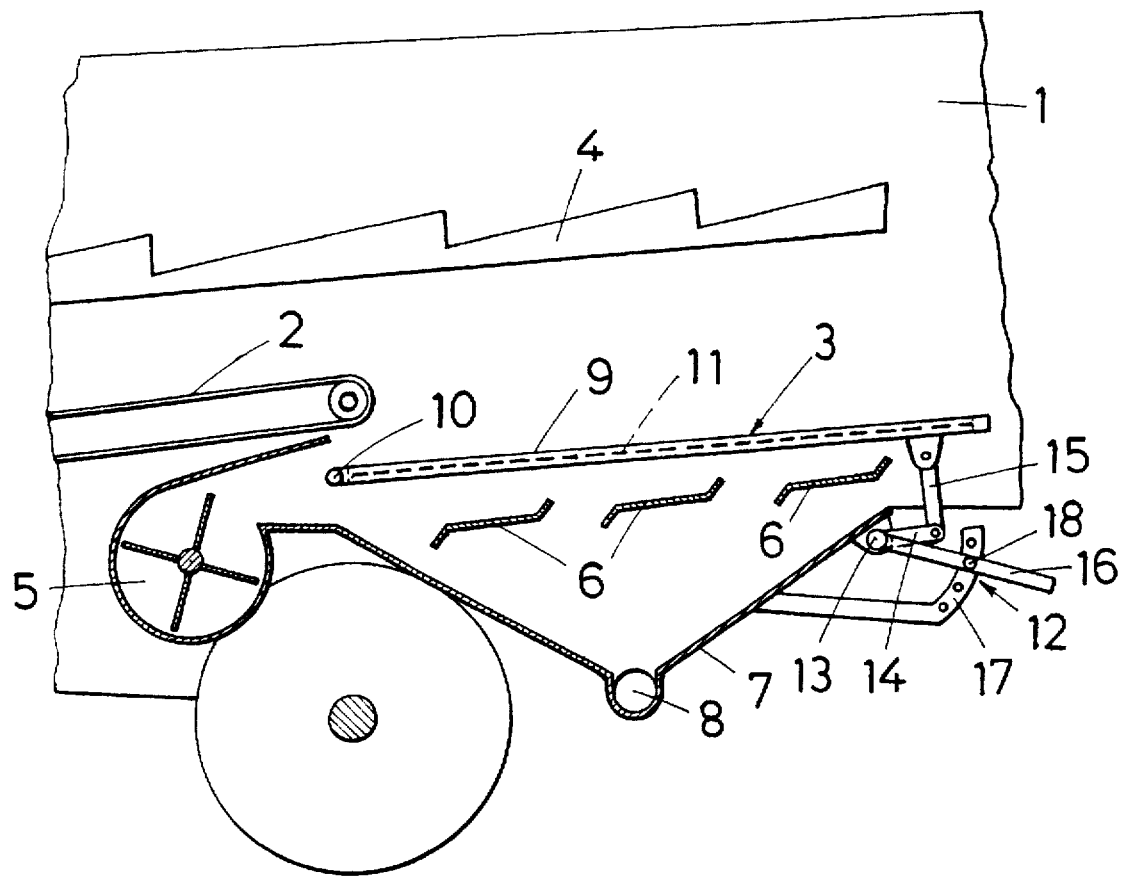

United States Patent [19]
Spiesberger et al.

[11] Patent Number: 5,795,223
[45] Date of Patent: Aug. 18, 1998

[54] SCREEN DEVICE FOR A HARVESTER-THRESHER, IN PARTICULAR A HARVESTER-THRESHER FOR A TEST FIELD

[75] Inventors: Franz Spiesberger, Lohnsburg; Johann Aigner, Ried/Innkreis, both of Austria

[73] Assignee: Wintersteiger GmbH, Ried, Austria

[21] Appl. No.: 750,317
[22] PCT Filed: May 24, 1995
[86] PCT No.: PCT/AT95/00101
    § 371 Date: Nov. 22, 1996
    § 102(e) Date: Nov. 22, 1996
[87] PCT Pub. No.: WO95/32609
    PCT Pub. Date: Dec. 7, 1995

[30] Foreign Application Priority Data

May 27, 1994 [AT] Austria ................ 1086/94

[51] Int. Cl.⁶ .................................. A01F 12/32
[52] U.S. Cl. ............................. 460/102; 460/94
[58] Field of Search ................... 460/102, 8, 72, 460/85, 94, 95, 101, 114, 119, 144, 145

[56] References Cited

U.S. PATENT DOCUMENTS

| | | |
|---|---|---|
| 680,187 | 8/1901 | Zimmerman. |
| 1,243,284 | 10/1917 | Goodman. |
| 1,383,918 | 7/1921 | Fadness. |
| 2,441,917 | 5/1948 | Dion. |
| 3,734,102 | 5/1973 | Pool ............................ 460/85 |
| 3,757,797 | 9/1973 | Mathews ..................... 460/101 |
| 4,535,788 | 8/1985 | Rowland-Hill et al. ..... 460/102 X |
| 4,712,568 | 12/1987 | Strong et al. ............... 460/101 X |

FOREIGN PATENT DOCUMENTS

| | | |
|---|---|---|
| 178018 | 4/1986 | European Pat. Off. . |
| 1079152 | 11/1954 | France. |
| 1194881 | 11/1959 | France. |
| 1196138 | 11/1959 | France. |
| 69861 | 8/1892 | Germany. |
| 6113664 | 4/1994 | Japan ......................... 460/101 |

*Primary Examiner*—Terry Lee Melius
*Attorney, Agent, or Firm*—Collard & Roe, P.C.

[57] ABSTRACT

There is described a screen device (3) for a harvester-thresher for a test field, comprising at least one frame (9) receiving a cleaning screen (11) and an adjusting means (12) for adjusting the frame (9) pivotally mounted about a transverse axis (10) in the chassis (1), where the adjusting means (12) consists of an actuating shaft (13) parallel to the swivel axis (10), mounted in the chassis (1) and connected to a swivel drive, which actuating shaft has at least one swivel arm (14) connected with the frame (9) via a connecting rod (15).

6 Claims, 4 Drawing Sheets

5,795,223

SCREEN DEVICE FOR A HARVESTER-THRESHER, IN PARTICULAR A HARVESTER-THRESHER FOR A TEST FIELD

This invention relates to a screen device for a harvester-thresher, in particular a harvester-thresher for a test field, comprising at least one frame receiving a cleaning screen, and an adjusting means for adjusting the frame pivotally mounted about a transverse axis in the chassis.

For cleaning the crops, which after the threshing operation are mixed with short straw, chaff and the like, from such admixtures, harvester-threshers are provided with screen devices connected behind a preparation tray for discarding the admixtures in cooperation with the air flow of a cleaning blower. This cleaning effect depends, among other things, on the set angle of the cleaning screens, especially in connection with comparatively short cleaning screens, as this is the case in harvester-threshers for test fields, and by a corresponding adjustment of the inclination of the cleaning screens can therefore be adapted to various types of fruit or to different field densities determining the amount of threshing material. For this purpose it is known to provide inserts with different inclinations for the cleaning screens, which excludes, however, a change of the inclination of the screen when the cleaning screens have been inserted. To overcome this disadvantage it has already been proposed to hold the cleaning screens in frames which are pivotally mounted about a transverse axis in the chassis of the harvester-thresher, and adjacent their end facing away from the swivel axis engage in an arcuate longitudinal guideway with laterally protruding pins, so that the frames can be clamped in their respective angular position with respect to the longitudinal guideways. Such adjusting means are, however, quite complicated to handle, because first of all the clamp connections on both longitudinal sides of the frame must be released, before the inclination of frame and screen can be changed. The new inclination of the screen must then again be secured by means of the clamping means provided on both sides, so that an adjustment of the inclination is often omitted, although the cleaning result could be improved considerably by such adjustment. In this connection it should be considered that every ascent or descent makes an adjustment of the inclination seem desirable, in order to ensure uniform cleaning results.

It is therefore the object of the invention to improve a screen device as described above with simple constructive means, so that an easy to handle adjustment of the inclination of the cleaning screens becomes possible.

This object is solved by the invention in that the adjusting means consists of an actuating shaft parallel to the swivel axis, mounted in the chassis and connected to a swivel drive, which actuating shaft has at least one swivel arm connected with the frame via a connecting rod.

Since there is provided an actuating shaft mounted in the chassis, the frame can be adjusted together with the cleaning screen from one end of the actuating shaft by means of a corresponding swivel drive, in the most simple case a manually operable swivel lever cooperating with a locking means, because the rotary movement of the actuating shaft is converted into a vertical movement of the free end of the frame by means of at least one swivel arm and the connecting rod pivotally mounted between said swivel arm and the frame. The exchangeability of the cleaning screens and, in the case of adjustable screens, the setting thereof are not affected by the adjustment of the inclination of the frame.

Such adjusting means for adjusting the inclination of the frame receiving a cleaning screen can, however, easily be actuated by a remote-controlled motor, which creates particularly simple handling conditions. In this connection, a predetermined control program provides for an automatic adjustment of the inclination in dependence on the kind and condition of the crops through a selection of predetermined parameters. In addition, an automatic adaptation of the screen inclinations to the respective slope of the ground would be possible.

In many cases there is used a two-stage screen device comprising two different cleaning screens disposed one above the other. When there are two frames for one cleaning screen, which are disposed one above the other and are each pivotally mounted about a transverse axis in the chassis, the adjusting means in accordance with a further embodiment of the invention can have, in addition to the actuating shaft mounted in the chassis for the one frame, another parallel actuating shaft for the other frame, which is mounted on said frame and in turn carries at least one swivel arm connected with the associated frame via a connecting rod. This embodiment in a simple manner accounts for the fact that after a basic setting of the mutual screen inclinations there is usually only required the common adjustment of both screens. This common adjustment of the inclination is effected by means of the actuating shaft mounted in the chassis, because the additional actuating shaft is supported on the one frame and adjusts the other frame only with respect to this frame, so that when the additional actuating shaft is locked with respect to this frame, both frames are connected by a connecting rod, which upon displacement of one frame carries along the other frame. The adjustment of one frame with respect to the other frame is effected by means of the actuating shaft provided on one of the frames.

An adjusting means of a similar design can be used for a screen device where the cleaning screen is divided into two sections by means of a hinge for setting the end portion at a larger angle of inclination than the remaining screen. In such a case, the adjusting means can have a further parallel actuating shaft mounted on this frame for the hinged end portion of the cleaning screen, in addition to the actuating shaft for the frame mounted in the chassis for receiving the cleaning screen, which further actuating shaft in turn carries at least one swivel arm connected with the end portion of the cleaning screen via a connecting rod. By means of the actuating shaft mounted in the chassis the entire cleaning screen is adjusted, and by means of the actuating shaft on the frame only the hinged end portion is adjusted with respect to the frame.

Another possibility for setting the inclination of two cleaning screens disposed one above the other consists in the fact that in addition to the actuating shaft mounted in the chassis, the adjusting means comprises a further actuating shaft designed as hollow shaft and coaxially surrounding said first actuating shaft, which further actuating shaft carries at least one swivel arm connected with the other frame via a connecting rod. By coaxially guiding the one actuating shaft in the other, hollow actuating shaft, a space-saving adjusting means is created, which for both frames provides for an independent adjustment of the inclination by means of the corresponding actuating shaft. This adjusting means, too, can be used for adjusting the inclination of a hinged cleaning screen, when the actuating shaft designed as hollow shaft, which is provided for the frame beside the actuating shaft mounted in the chassis, carries at least one swivel arm connected with the hinged end portion of the cleaning screen via a connecting rod.

When in the case of an arrangement of two coaxial actuating shafts common swivel movements of the frames or the frame and the hinged end portion of the screen should be possible, the swivel drives for the two actuating shafts may be coupled. For this purpose, the swivel drives may each comprise one swivel lever and one locking means for the swivel lever, where the locking means have locking disks commonly rotatable about the axis of the actuating shafts. When one of the two swivel levers is actuated, only the associated frame or screen section is adjusted by means of the actuating shaft connected with said swivel lever. For the common actuation of both actuating shafts it is merely necessary to rotate the two locking disks by means of a common drive.

Figure 2:
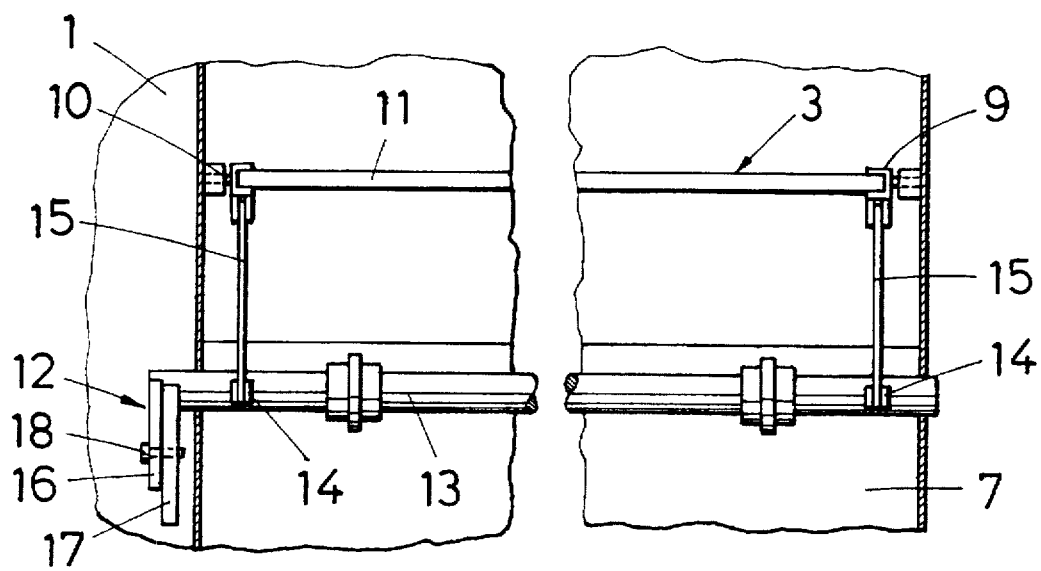
Figure 3:
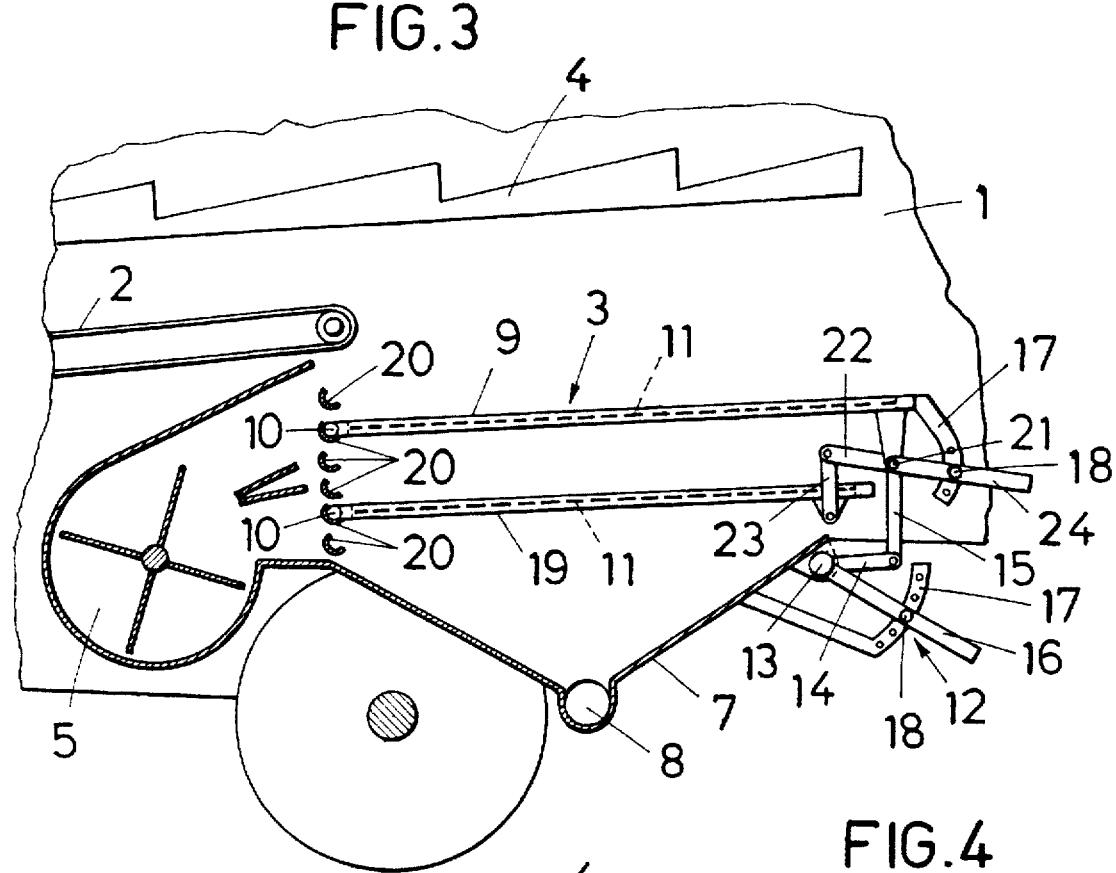
Figure 4:
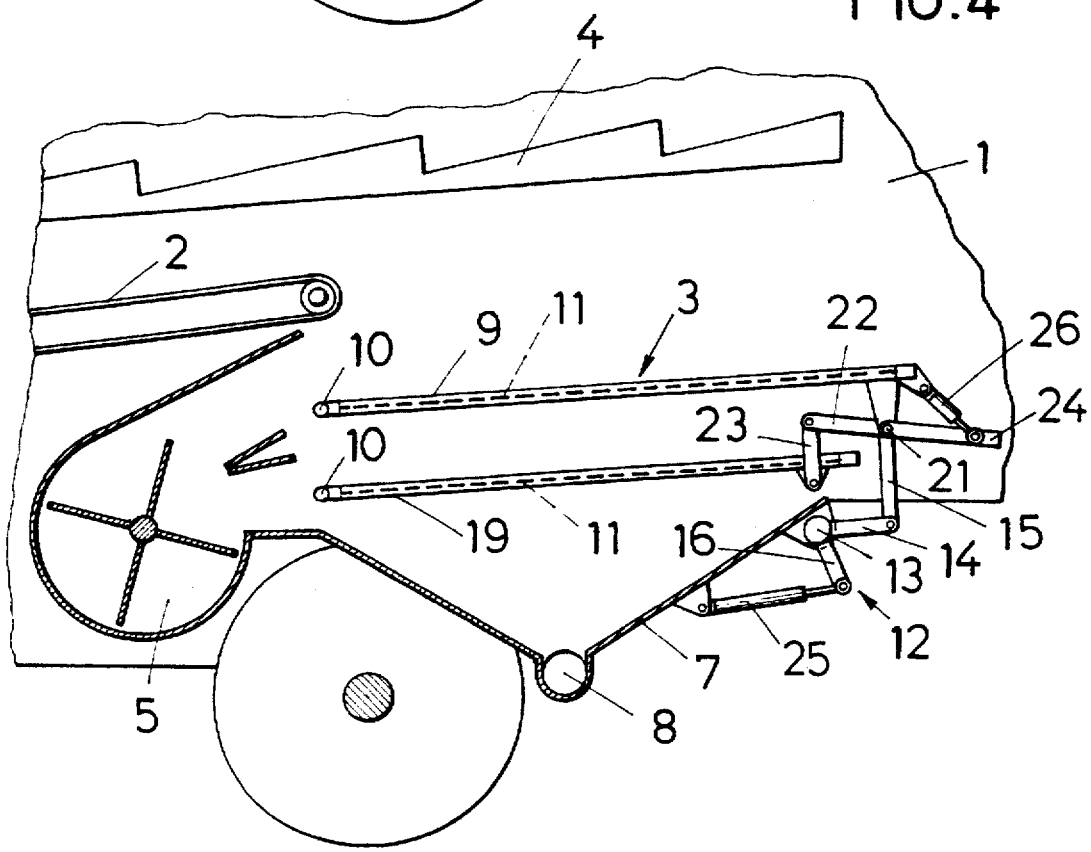
Figure 5:
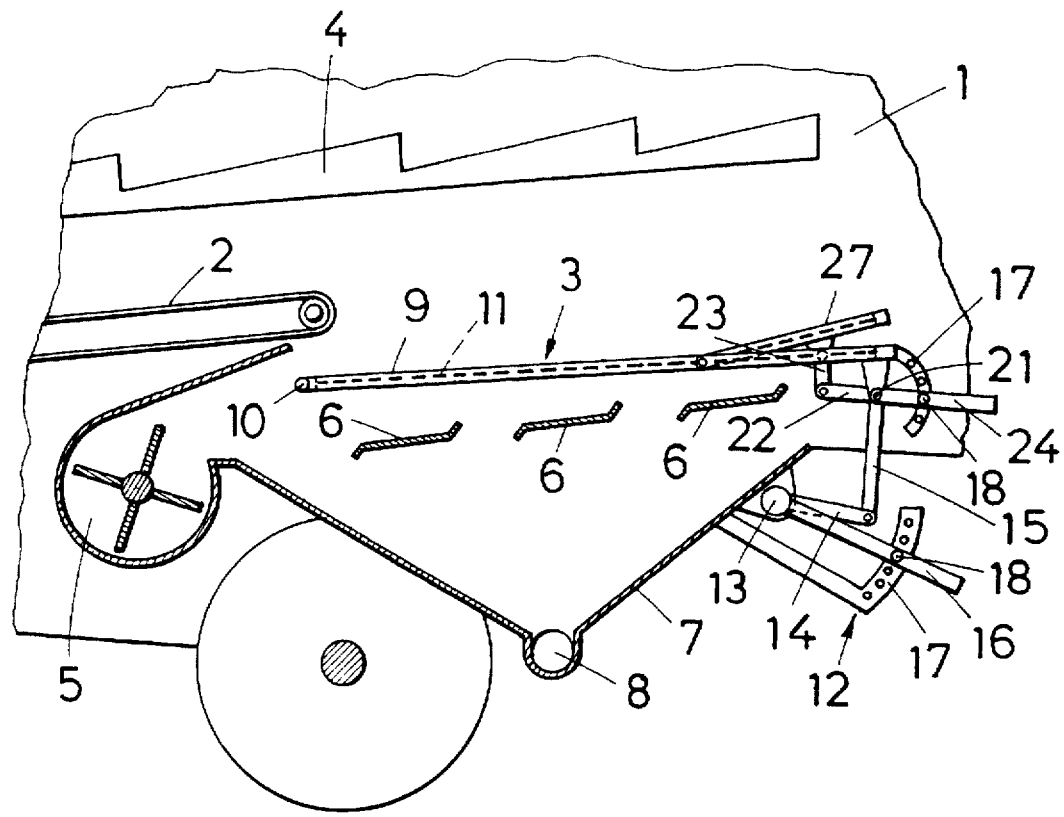
Figure 6:
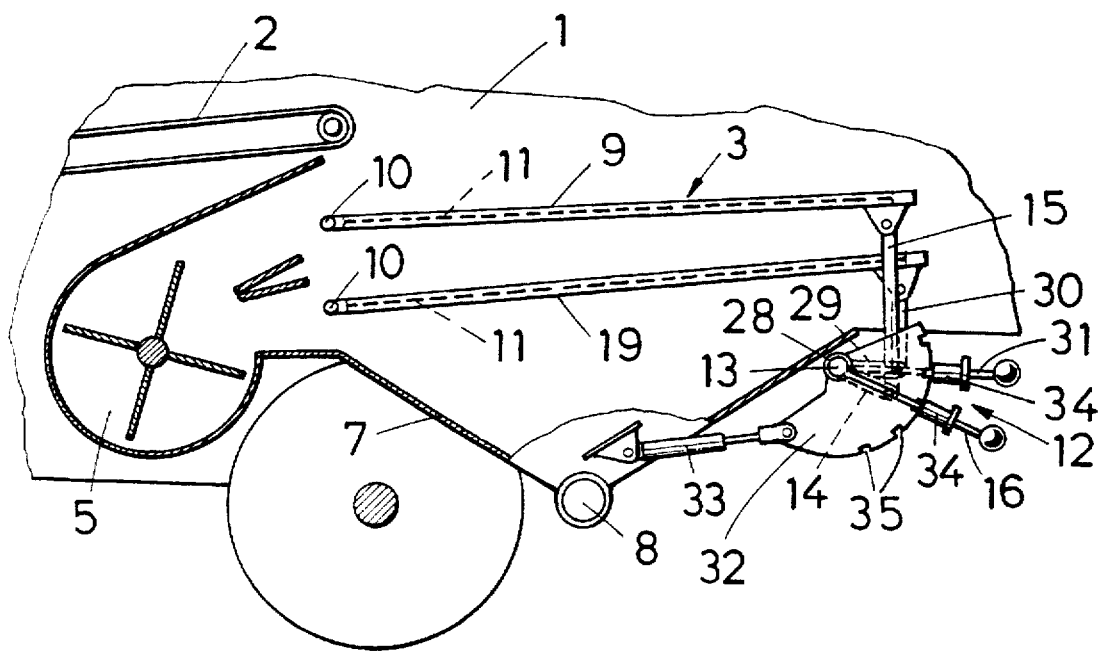
Figure 7:
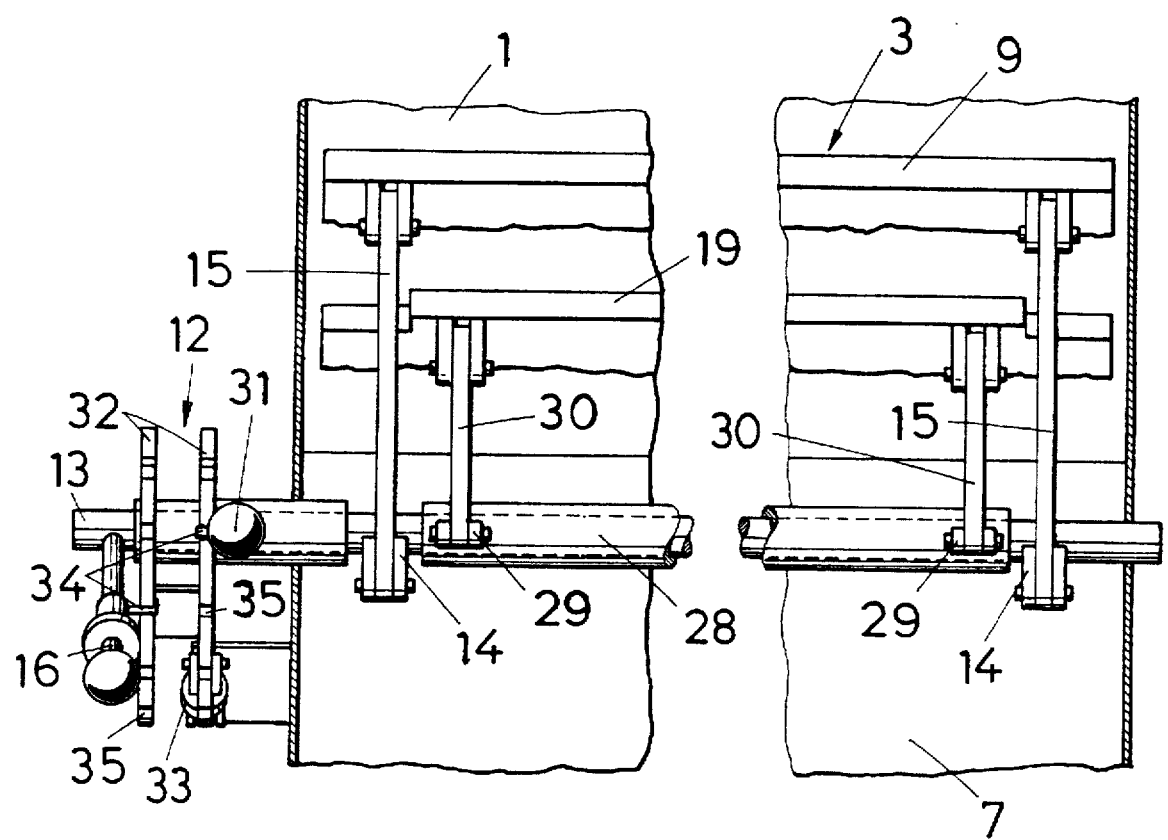

In the drawing, the subject-matter of the invention is represented by way of example, wherein:

FIG. 1 shows a screen device in accordance with the invention in a schematic longitudinal section through a partially illustrated harvester-thresher for a test field, FIG. 2 shows the screen device in accordance with FIG. 1 in a schematic cross-section through the harvester-thresher on a larger scale, FIG. 3 shows a representation corresponding to FIG. 1 of an embodiment comprising two cleaning screens arranged one above the other, FIG. 4 shows an adjusting means for the cleaning screens arranged one above the other in accordance with FIG. 3, but with remote-controlled swivel drives, FIG. 5 shows a hinged cleaning screen including an adjusting means in accordance with FIG. 3, FIG. 6 shows a further embodiment of an adjusting means for two cleaning screens arranged one above the other in a schematic longitudinal section through a harvester-thresher for a test field, and FIG. 7 shows the adjusting means in accordance with FIG. 6 in a schematic cross-section through the harvester-thresher on a larger scale.

In accordance with the embodiment shown in FIG. 1 and 2, the schematically indicated chassis 1 of a harvester-thresher for a test field comprises as usual a conveying tray 2 in the form of a circulating conveyor belt, which receives the threshing material from the threshing cylinder via the threshing basket for passing on the crops mixed with short straw, chaff and the like to a screen device 3, whereas the straw and the remaining plant parts discarded by the threshing basket are discharged via a shaker 4. The screen device 3 cooperates with a cleaning blower 5, which provides a classifying air flow through the screen device 3. To ensure a corresponding air flow, baffle plates 6 may be provided below the screen device 3. The crops cleaned by the screen device 3 are collected in a collecting funnel 7 and discharged for instance via a pneumatic conveying line 8.

In accordance with FIG. 1 and 2, the screen device 3 itself consists of a frame 9 pivotally mounted about a transverse axis 10 in the chassis 1 and constituting an insertion guideway for a cleaning screen 11, so that the screen device 3 can be equipped with various cleaning screens as required. The inclination of the frame 9 is adjusted by means of an adjusting means 12, which comprises an actuating shaft 13 parallel to the swivel axis 10 of the frame 9 and mounted in the chassis 1, on both sides of which actuating shaft swivel arms 14 are seated, between which and the frame 9 connecting rods 15 are articulated. At one end of the actuating shaft 13 a manually operable swivel lever 16 is provided, whose rotary positions can be locked by means of a locking means 17. This locking means 17 substantially consists of a strip with holes, in which holes a locking pin 18 engages, which is provided on the swivel lever 16.

For adjusting the inclination of the screen device 3 it is merely necessary to swivel the swivel lever 16 when the same has been unlocked, where the swivel arms 14 are also rotated by means of the actuating shaft 13, which results in a corresponding vertical movement of the frame 9 via the connecting rod 15 and thus an adjustment of the inclination of the cleaning screen 11 about the swivel axis 10 of the frame 9. To ensure uniform flow conditions in the vicinity of the screen device 3, the baffle plates 6 can be swivelled together with the frame 9.

In contrast to the embodiment in accordance with FIG. 1 and 2, the embodiment in accordance with FIG. 3 shows a screen device 3 comprising two frames 9 and 19 arranged one above the other, each for one cleaning screen 11. These two frames 9 and 19 are pivotally mounted about swivel axes 10 in the chassis 1, where the swivel axes 10 can selectively be inserted in various bearings 20, which together with the adjusting means 12 for adjusting the screen inclinations provides for a considerable adaptation of the screen device 3 to different conditions.

The frame 9 for the upper cleaning screen 11 can be moved in accordance with the adjusting means 12 shown in FIG. 1 and 2 by means of an actuating shaft 13, which is in drive connection with the frame 9 via the swivel arms 14 and the connecting rod 15. For setting the inclination of the frame 19 with respect to the frame 9, a further actuating shaft 21 is mounted on the frame 9, which in a comparable way communicates with the lower frame 19 via the swivel arms 22 and the connecting rod 23. When the actuating shaft 21 is rotated by means of a manually adjustable swivel lever 24, the frame 19 with the inserted cleaning screen 11 is swivelled with respect to the cleaning screen 11 of the upper frame 9. The locking of the swivel lever 24 is effected like the locking of the swivel lever 16 of the actuating shaft 13 by means of a locking means 17 in the form of a strip with holes cooperating with a locking pin 18. When the swivel lever 16 is actuated for adjusting the upper cleaning screen 11, both the upper and the lower cleaning screen are moved together.

The swivel drives for the actuating shafts 13 and 21 need not be adjusted manually. In this case, remote-controlled, motor-driven adjusting means may advantageously be provided, as this is illustrated in FIG. 4, which shows swivel cylinders 25 and 26 acting on the swivel levers 16 and 24 for adjusting the actuating shafts 13 and 21. By means of these swivel cylinders there can also be effected the locking of the selected screen inclination. It need probably not be emphasized that there may also be used only one swivel cylinder for preferably the actuating shaft 13, because in general after a basic setting of the mutual inclination of the two cleaning screens 11 both cleaning screens are only adjusted together.

As can be taken from FIG. 5, the adjusting device 12 represented in FIG. 3 may also be used for setting a cleaning screen 11 divided into two sections by means of a hinge. In this case, the frame 9 for the cleaning screen 11 is adjusted by means of the actuating shaft 13 mounted in the chassis 1, whereas the actuating shaft mounted on the frame 9 is in drive connection with the hinged end portion 27 of the cleaning screen 11. By means of the swivel lever 16, which can of course again be actuated by a motor drive, the entire cleaning screen 11 is swivelled, where the inclination of the end portion 27 with respect to the frame 9 or the remaining screen portion is adjusted by means of the swivel lever 24.

A further possibility for adjusting the inclination of two cleaning screens arranged one above the other is represented in FIG. 6 and 7. In addition to the actuating shaft 13 mounted in the chassis 1 the adjusting means 12 comprises a hollow actuating shaft 28, which coaxially surrounds the actuating shaft 13 and can be rotated independent thereof. While the actuating shaft 13 engages in the frame 9 for the upper cleaning screen via the swivel arms 14 and the connecting rod 15, the frame 19 for the lower cleaning screen is adjusted by means of the hollow actuating shaft 28 via the swivel arms 29 and the connecting rod 30. As swivel drives for both actuating shafts swivel arms 16 and 31 are used, which cooperate with locking means in the form of segment-shaped locking disks 32, which are mounted so as to be freely rotatable on the hollow actuating shaft 28 and can only be rotated together by means of a swivel cylinder 33. Since on the swivel levers 16 and 31 there are mounted locking bodies 34 which are axially movable against spring force and engage in locking recesses 35 of the locking disks 32, a locking of the swivel levers 16 and 31 with respect to the locking disks 32 is effected, so that both actuating shafts 14 and 28 are adjusted together by means of the swivel cylinder 33. A mutual swivel adjustment of the frames 9 and 19 is effected by means of the manually adjustable swivel levers 16 and 31 when the same have been unlocked.

We claim:

1. A screen device for a harvester-thresher, comprising
   (a) a chassis,
   (b) two superposed frames for holding cleaning screens,
   (c) respective transverse axles pivotally mounting the superposed frames in the chassis, and
   (d) adjusting means for changing the pivotal position of the two superposed frames, the adjusting means comprising
       (1) two actuating shafts extending parallel to the transverse axles and connected to swivel drives, a first one of the actuating shafts being mounted in the chassis and a second one of the actuating shafts being mounted on one of the superposed frames,
       (2) at least one swivel arm affixed to each one of the actuating shafts, and
       (3) a respective connecting rod connecting each swivel arm of the first actuating shaft to the one superposed frame and each swivel arm of the second actuating shaft to the other superposed frame.

2. The screen device of claim 1, wherein each swivel drive is comprised of a swivel lever and locking means for locking the swivel lever in selected locked positions.

3. A screen device for a harvester-thresher, comprising
   (a) a chassis,
   (b) two superposed frames for holding cleaning screens,
   (c) respective transverse axles pivotally mounting the superposed frames in the chassis, and
   (d) adjusting means for changing the pivotal position of the two superposed frames, the adjusting means comprising
       (1) two actuating shafts extending parallel to the transverse axles and connected to swivel drives, a first one of the actuating shafts being mounted in the chassis and a second one of the actuating shafts being a hollow shaft mounted on the first actuating shaft,
       (2) at least one swivel arm affixed to each one of the actuating shafts, and
       (3) a respective connecting rod connecting each swivel arm of the first actuating shaft to the one superposed frame and each swivel arm of the second hollow actuating shaft to the other superposed frame.

4. The screen device of claim 3, wherein each swivel drive is comprised of a swivel lever and locking means for locking the swivel lever in selected locked positions.

5. A screen device for a harvester-thresher, comprising
   (a) a chassis,
   (b) a two-part frame for holding a cleaning screen, the two-part frame comprising an articulated end portion,
   (c) a transverse axle pivotally mounting the two-part frame in the chassis, and
   (d) adjusting means for changing the pivotal positions of the two-part frame and the articulated end portion, the adjusting means comprising
       (1) two actuating shafts extending parallel to the transverse axle and connected to swivel drives, a first one of the actuating shafts being mounted in the chassis and a second one of the actuating shafts being mounted on the articulated end portion,
       (2) at least one swivel arm affixed to each one of the actuating shafts, and
       (3) a respective connecting rod connecting each swivel arm of the first actuating shaft to the two-part frame and each swivel arm of the second actuating shaft to the articulated end portion.

6. The screen device of claim 5, wherein each swivel drive is comprised of a swivel lever and locking means for locking the swivel lever in selected locked positions.

* * * * *